April 16, 1946.  C. W. CARROLL  2,398,409
SHUTTER DRIVE MECHANISM
Filed March 28, 1944  3 Sheets-Sheet 1

CLARENCE W. CARROLL
INVENTOR

BY
ATTORNEYS

April 16, 1946.   C. W. CARROLL   2,398,409
SHUTTER DRIVE MECHANISM
Filed March 28, 1944   3 Sheets-Sheet 2
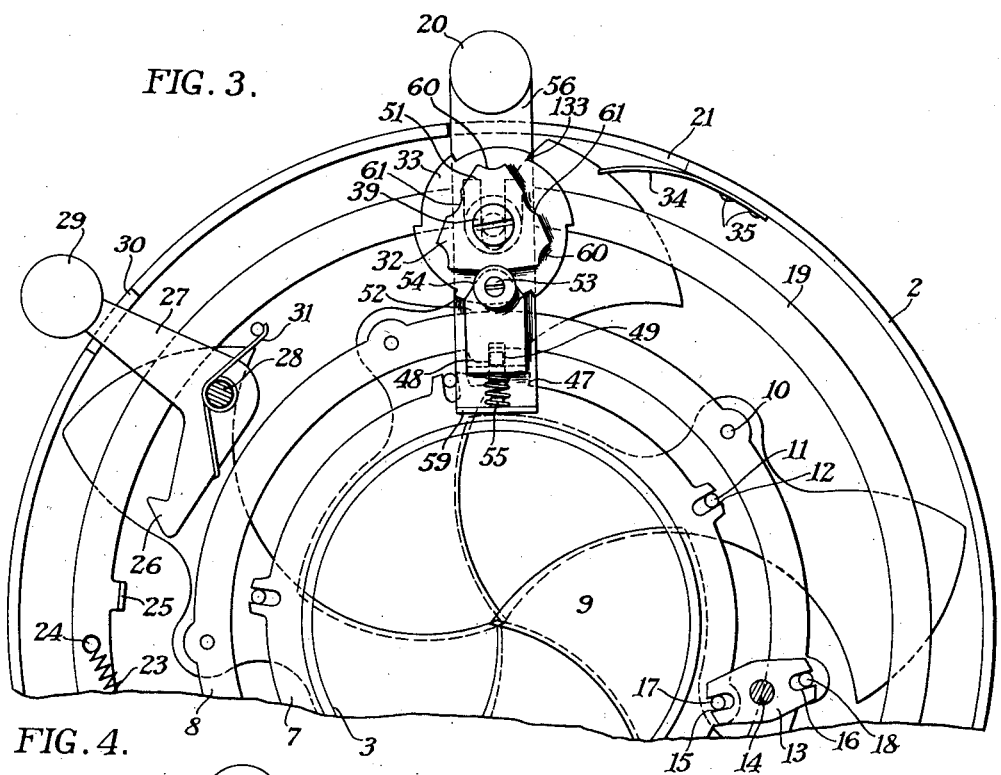
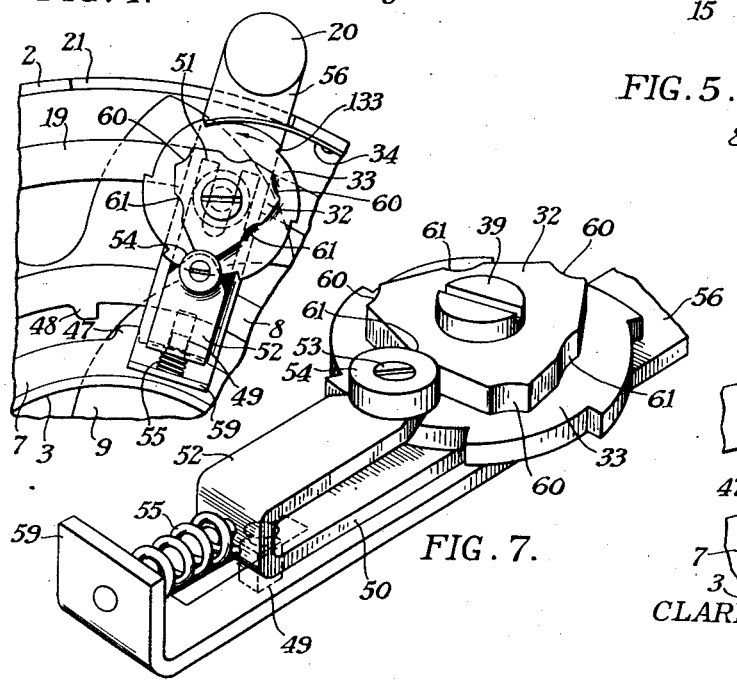
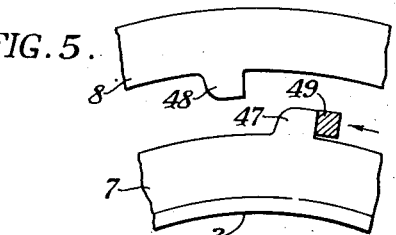
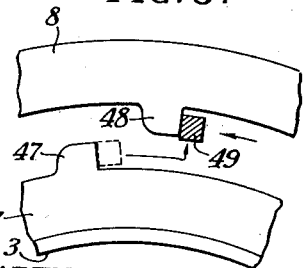
CLARENCE W. CARROLL
INVENTOR
BY
ATTORNEYS April 16, 1946.   C. W. CARROLL   2,398,409
SHUTTER DRIVE MECHANISM
Filed March 28, 1944   3 Sheets-Sheet 3

CLARENCE W. CARROLL
INVENTOR
BY
ATTORNEYS

Patented Apr. 16, 1946

2,398,409

UNITED STATES PATENT OFFICE 2,398,409

SHUTTER DRIVE MECHANISM

Clarence W. Carroll, Rochester, N. Y., assignor to Eastman Kodak Company, Rochester, N. Y., a corporation of New Jersey Application March 28, 1944, Serial No. 528,418

10 Claims. (Cl. 95—63)

This invention relates to camera shutters and particularly to shutters in which there is a blade driving mechanism which is capable of obtaining high speed exposures. One object of my invention is to provide a shutter mechanism in which double-ended shutter leaves are employed and in which these shutter leaves move in a single direction for both opening and closing the exposure aperture of a shutter. Another object of my invention is to provide a shutter driving mechanism which will drive the shutter leaves in one direction for making one exposure and in a reverse direction for making the next exposure. A further object of my invention is to provide a shutter mechanism having a master member which may be set by moving it in one direction only and to provide a selector mechanism by which the master member having a driving movement in one direction may drive the shutter blades in either of two directions. A still further object of my invention is to provide an extremely simple shutter mechanism with which high speed exposures can be readily obtained, and other objects will appear from the following specification, the novel features being particularly pointed out in the claims at the end thereof.

In shutters of the between-the-lens type it is well known that the customary type of shutter, in which the blades move in one direction for opening and in the opposite direction for closing an exposure aperture, cannot be made to give extremely high speeds—say from 1/700 to 1/800 of a second exposure—because it is very difficult to overcome the inertia of reversing the movement of the shutter blades in the middle of an exposure. It is also well known that shutters provided with double-ended blades which travel in only one direction for opening and closing an exposure aperture are susceptible of much higher speeds than the first type of shutter above mentioned, but they normally suffer from the disadvantage of having a driving mechanism which must be reversed between exposures and such driving mechanisms, so far as applicant has been aware, have been rather complicated and not particularly satisfactory.

I have provided a shutter drive mechanism which is quite simple and efficient in operation and which permits the usual type of master member to be employed, such a master member being set by movement of a lever in one direction only and employing a driving stroke for operating the shutter mechanism which also moves in only a single direction.

Coming now to the drawings wherein like reference characters denote like parts throughout:

Fig. 3 is a fragmentary front elevation of the shutter mechanism shown in Fig. 1 but with the parts in the position they assume after an exposure has been completed, Fig. 1 showing the same parts when the shutter is set for an exposure;

Fig. 4 is a fragmentary detail showing a portion of the selector operating mechanism;

Figs. 5 and 6 are fragmentary views showing the relationship between the two blade rings and the driving pin, Fig. 5 showing the driving pin in position to operate the inner blade ring and Fig. 6 showing the drive pin in position to operate the outer blade ring;

Fig. 7 is an enlarged perspective view of the selector and driving member removed from the shutter;

I am aware that a number of patents illustrate shutters utilizing double-ended blades which may be driven in one direction and then the other for making an exposure and I am also aware that two blade rings have been proposed for so driving shutter leaves as in Patent No. 1,166,921, McPhee, January 6, 1916. In this patent, however, the master member is arranged to drive in two different directions and the release member carries a pair of releases thus multiplying the parts and making the shutter more complicated than the usual type of shutter which is set by moving a setting member in one direction and which is always released by the same trigger.

In the shutter which will now be described I have provided the standard type of setting and releasing mechanism and I am able to employ shutter blades of the same general type shown in the McPhee patent but employ an entirely different type of driving mechanism to actuate the shutter blades.

Figure 2:
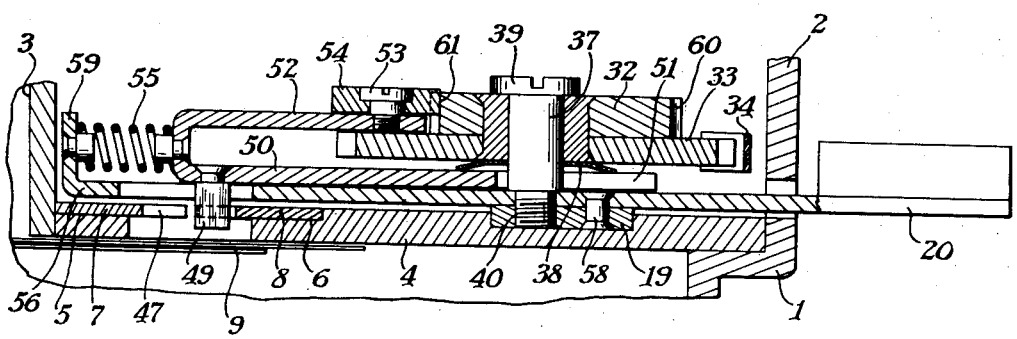
Fig. 2 is an enlarged sectional view taken on line 2—2 of Fig. 1.

More specifically, my shutter may consist of the usual shutter casing 1 having an upstanding flange 2 around the periphery of the shutter and having an exposure aperture 3 in the center thereof. This casing may include a mechanism plate 4, as best shown in Fig. 2, this mechanism plate carrying slideways 5 and 6 for inner and outer blade rings 7 and 8. The shutter leaves 9 are carried by the two blade rings being pivoted at 10 to the outer blade rings and carrying pins 11 engaging slots 12 in the inner blade ring in the form of my invention illustrated. Obviously it is immaterial which blade ring carries the pin and slot connections. The blade rings 7 and 8 are connected by means of a rocker arm 13 pivoted at 14 to the shutter and having slotted ends 15 and 16 to engage upstanding pins 17 and 18 on the blade rings 7 and 8 so that, when blade ring 7 moves in a clockwise direction, blade ring 8 will move in a reverse direction, and vice versa. It will be noticed that the shutter blades 9 are of the symmetrical double-ended type and when the blade rings move to their full extent each shutter blade is rocked by the two blade rings so as to first open and then close the exposure aperture 3 while moving in one direction. Thus the shutter blades, when driven in accordance with my driving mechanism which will now be described, will be driven in a clockwise direction for making another exposure.

Figure 1:
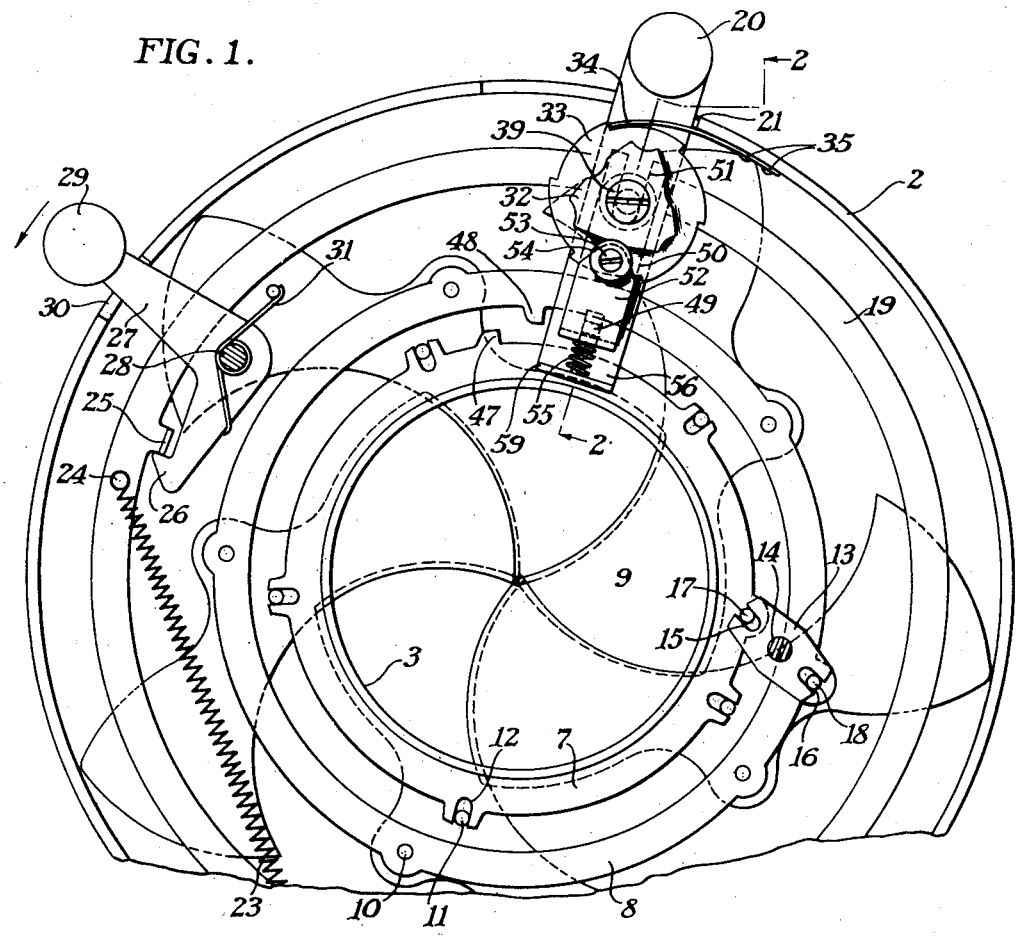
Fig. 1 is a fragmentary front plan view of a shutter drive mechanism constructed in accordance with and embodying a preferred form of my invention.

In the present form of my invention the master member may consist of a ring 19 from which a setting handle 20 projects outwardly through a slot 21 in the flange 2. One or more springs 23 attached to the master member ring may tend to turn it in a counter clockwise direction. The illustrated spring 23 is attached to a pin 24 on the master member ring and is anchored to the shutter casing 1 upon a suitable pin not shown. The master member ring 19 is provided with an upstanding lug 25 which forms one latch element, a second latch element 26 being carried on the bell crank lever 27 pivoted at 28 to the shutter casing and having an operating handle 29 extending out through a slot 30 in the upstanding flange 2. This member constitutes the trigger which will hold the master member in a set position as shown in Fig. 1 with the spring 23 under tension and in position to operate the shutter mechanism. The trigger 29 may be held by a spring 31 in its latching position from which it needs to be moved only a slight distance in a counterclockwise direction with respect to Fig. 1 to release the master member.

When the setting lever 20 has been moved to the Fig. 1 position, and the shutter parts are in the position therein shown, the selector 32 which is carried by a ratchet 33 has been moved by the spring pawl 34 through the setting movement of the setting lever 20. The spring pawl 34 may be attached as by rivets 35 to the upstanding flange 2. As best shown in Fig. 2, the selector 32 and the ratchet 33 are fastened together and are mounted upon a stud 37 being pressed by a spring washer 38 against the head 39 of the stud to frictionally hold the parts in a set position. The master member 19 carries the stud 37 through a threaded connection 40 so that the setting lever 20 carries this entire mechanism which is extremely small and light in weight. The parts shown in Fig. 2 are illustrated on a much enlarged scale.

The blade rings 7 and 8 are equipped with driving lugs 47 on the inner blade ring 7 and 48 on the outer blade ring 8. These lugs or protuberances, in the form of my invention illustrated in the first seven figures, may project towards each other and there is a square driving pin 49 carried by a driver 50 which may be moved by the selector into a position shown in Fig. 5 in which it may drive the inner blade ring 7 or to the position shown in Fig. 6 in which it may drive the outer blade ring 8. Thus, the driving stroke of the square pin 49 is always in a counterclockwise direction, but since it may be made to engage either the blade ring 7 or the blade ring 8, these are successively driven causing the blades to move in one direction for one exposure and in an opposite direction for the next exposure while the driving pin 49 is always moved in the same direction.

The driver 50 consists of a thin, formed-up metal plate (best shown in Figs. 7 and 2). The end 51 of this plate is slotted to slide on the stud 37 and the upper arm 52 of this plate lies over a portion of the ratchet wheel 33 and carries a stud 53 on which a roller 54 is mounted, this roller riding on and being located by the cam 32 since the spring 55 normally thrusts the driver 50 toward the cam. The arm 56, which is also attached to the master member 19 as by a rivet 58, is bent up at 59 to form a support for the end of the spring 55.

From Fig. 7 it will be noticed that the cam 32 is provided with two sets of surfaces which are differentially spaced from its center of rotation, that is the stud 37. One set of these surfaces 60, here shown as three in number, are spaced a greater distance from the center of stud 38 than are the second set of surfaces 61. Thus, when the roller 54 is located by any of the surfaces 60 the driving pin 49 will be positioned as shown in Fig. 5 to engage the inner blade ring 7. When the roller is positioned by any of the surfaces 61 the squared driving pin 49 will be positioned as in Fig. 6 to drive the outer blade ring. Since the cam 32 is rotated by the ratchet wheel 33 each time the shutter is set through the spring pawl 34 engaging a tooth 133 of the ratchet 33, it will be obvious that the cam is rotated a distance sufficient to move the roller 54 between one surface 60 and the next surface 61, or one surface 61 and the next surface 60. While I have shown a six-toothed ratchet and a cam having six different surfaces arranged in two sets as above described, it is obvious that more or less surfaces can be used according to the design of the selector and that this design can be altered so that more or less of the complete stroke of the setting handle 20 may be used to actuate the selector.

The operation of the preferred form of my invention described above may be briefly reviewed as follows: With the parts in the position of Fig. 3, an operator may move the setting handle 20 in a clockwise direction to tension the master member 19. Toward the last part of the movement of the handle 20 the spring pawl 34 engages a tooth 133 of the ratchet 33, turning this member a distance approximately equal to one tooth. This causes the roller 54 to pass from the surface 61 in which it rests to the surface 60 since the spring 55 holds the roller 54 against the cam surface. This movement positions the driving pin 49 in the position shown in Fig. 5 wherein it may strike a driving lug 47 of the blade ring 7.

The trigger 29 is now moved downwardly to release the latch elements 25—26. When the release occurs spring 23 drives the master member ring 19 rapidly in a counterclockwise direction and the driver 50 with its driving pin 49 gets up to speed and strikes the driving lug 47 of the driving ring 7 moving it rapidly in a counterclockwise direction and at the same time through the rocker arm 13 moving the blade ring 8 in an opposite direction. This causes the blades 9 to open and close while moving in a counterclockwise direction.

For the next exposure the operator again moves the setting lever 20 in the same direction and the pawl 34 will again move the ratchet 33 one step, this time moving the driving pin through the contact of roller 54 and cam 32 into position to drive the outer blade ring lug 48 as shown in Fig. 6. When in this position the roller 54 is in engagement with one of the surfaces 61 so that the driver pin 49 moves the outer blade ring 8 in a counterclockwise direction to reverse the movement of the shutter leaves.

With the blade ring driving mechanism operating through a selector it is unnecessary to provide one spring or two springs which have to be tensioned in different directions for driving the master member first in one direction and then in the other because with my construction the master member is always moved in a single direction in driving the shutter leaves.

Figure 8:
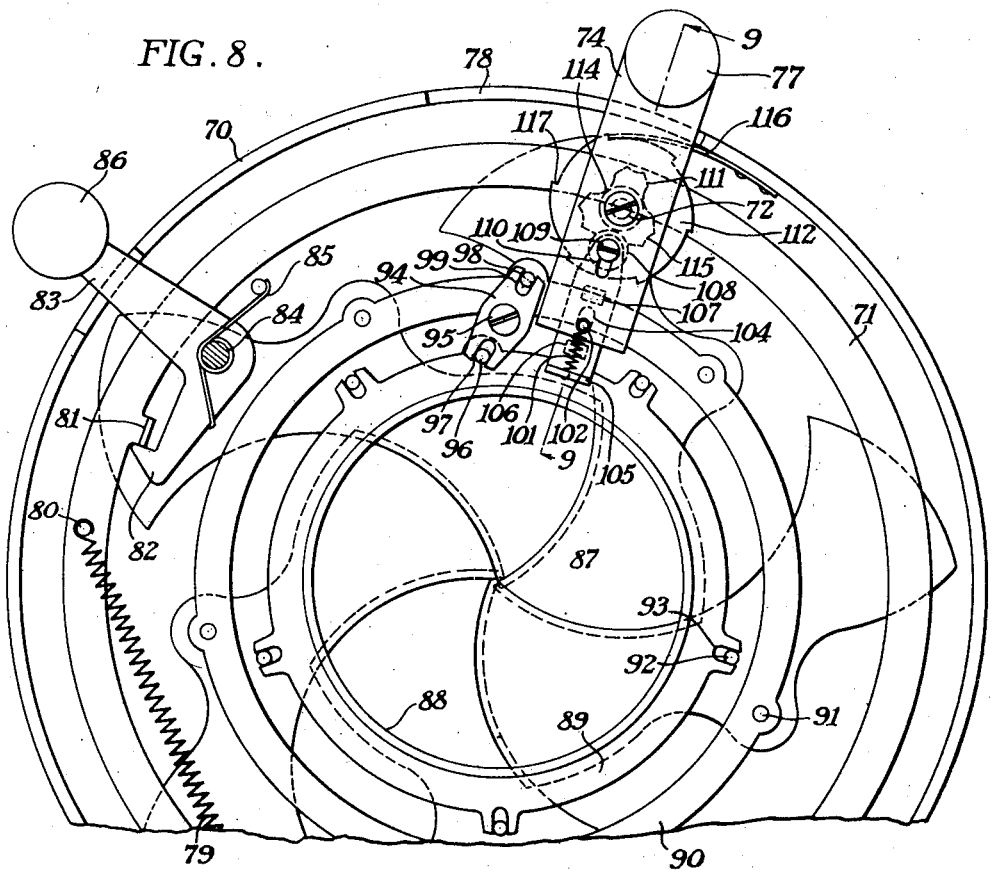
Fig. 8 is a fragmentary front elevation of a shutter constructed in accordance with a second embodiment of my invention.
Figure 9:
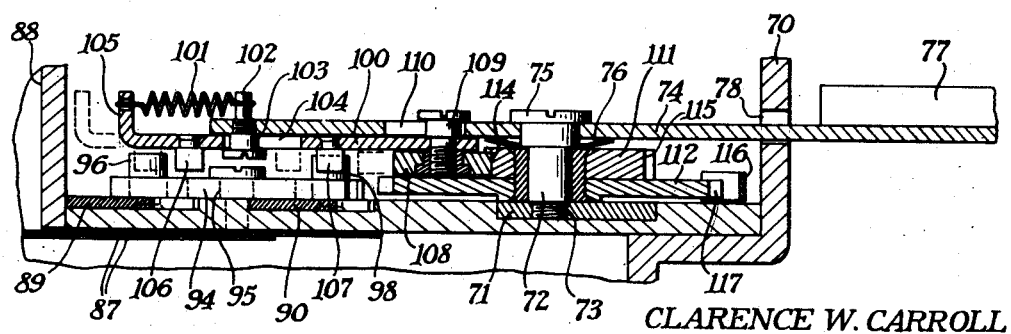
Fig. 9 is a section taken on line 9—9 of Fig. 8.

A second embodiment of my invention is shown in Figs. 8 and 9 which in some ways may be considered preferable to the first embodiment, although in function, this shutter drive mechanism accomplishes exactly the same results. In this figure the shutter casing 70 may be like the shutter casing first described and it may support a master member 71 which, as shown in Fig. 9, may carry a stud 72 through a threaded connection at 73 therewith and may support a handle 74 which may be pressed against the head 75 of the stud by means of a spring washer 76. The setting handle 77 projects out through a slot 78 in the shutter casing and is used to turn the master member in a clockwise direction until the spring 79 anchored on the pin 80 carried by the master member is under tension and until the latch member 81 of the master member is engaged by the latch 82 which is formed on one arm of a bell crank lever 83 pivoted at 84 to the casing. A spring 85 tends to turn the crank 83 into a latching position and by depressing the handle 86 the latch elements may be released.

A plurality of symmetrical double-ended shutter leaves 87 are employed, the number here shown being 5. These shutter leaves like the shutter leaves 9 may move in one direction to both open and close the exposure aperture 88 and may move in a reverse direction for the next successive exposure to open and close the shutter aperture 88. In order to move these shutter leaves a pair of blade rings are used, an inner blade ring 89 and an outer blade ring 90, the blades being pivotally attached at 91 to the outer blade ring and having a pin 92 and slot 93 connection with the inner blade ring.

As was the case with the blade rings 7 and 8, the blade rings 89 and 90 are movable simultaneously in opposite directions through a rocker arm 94 pivoted at 95 to the casing and having a pin 96 and slot 97 connection with the inner blade ring 89 and a similar pin 98 and slot 99 connection with the outer blade ring 90. However, unlike the first embodiment of my invention, the pins 96 and 98 project upwardly above the rocker arm 94 into the positions shown in Fig. 9. These pins are used as driving pins for the blade rings 89 and 90, and in this instance the driver 100 consists of a slidably mounted plate which may be moved relative to the arm 74 by means of a spring 101 encircling a pin 102 carrying a shoulder 103 passing through a slot 104 in the driving member 100. The end 105 of the driver is formed upwardly to support the other end of the spring 100. The driver carries a pair of downwardly extending driving pins 106 and 107 and one or the other of these pins is brought into alignment with the upstanding pins 96 and 98 of the rocker arm 94 by means of a roller 108 supported by the driver 100 and having a shoulder 109 mounted to slide freely in the slot 110 of the arm 74. The roller 108 is pressed by spring 101 into contact with a cam 111, this cam being fixedly attached to a ratchet 112 and being frictionally held by means of the spring washer 76 in a set position. The cam 111 is provided with two sets of surfaces 114 which are near the center of rotation of the cam—that is of the stud 72, the second set of surfaces 115 being spaced somewhat further from the center of the stud 72.

The ratchet 112 is like the ratchet 33 in that it is turned one tooth at a time by means of a spring pawl 116 which engages the successive teeth 117 as the setting lever 77 is moved toward its set position. Thus successive operations of the setting lever 77 cause the cam 111 to turn and cause the roller 108 to alternately engage the high or low surfaces on the cam, that is the surfaces 115 which are spaced furthest from the stud 72 and the spaces 114 which are the closest to the stud 72. When the roller is moved by the cam the driver 100 is likewise moved so that successive operations of the setting lever cause successive positioning of the driving pins 106 and 107 to come opposite the upstanding pins 96 and 98 of the rocker arm.

With the parts positioned as shown in Fig. 8 the trigger handle 86 may be depressed permitting the master member to move in a counterclockwise direction with respect to this figure. This driving member causes the driving pin 107 to strike the upstanding pin 98, turning the outer blade ring 90 in a counterclockwise direction and simultaneously turning the inner blade ring 89 in a clockwisewise direction. This causes the shutter blades to swing open and closed while moving in a counterclockwise direction with respect to Fig. 1. The operator may then set the shutter by moving handle 77 in a clockwise direction. As this movement occurs, the spring pawl 116 engages a tooth 117 on the ratchet wheel 112, turning the ratchet wheel during the last portion of the setting stroke. The ratchet wheel will, therefore, turn the cam 111, ⅛ of a revolution which is sufficient to cause the roller to move from a recessed surface 114 to an outwardly projecting surface 115. This movement causes the driver 100 to move a distance sufficient to place the driving pin 106 in a driving position with respect to the upstanding pin 96 and to remove the driving pin 107 from the path of the upstanding pin 98. Therefore, when the trigger handle 86 is released and the master member again moves in its counterclockwise direction, it will strike the pin 96, thereby turning blade ring 90 in a clockwise direction and blade ring 89 in a counterclockwise direction. Such a movement causes the shutter blades to open and close while moving in an opposite direction from the direction in which they moved in the previous exposure.

It should be noticed that in both embodiments in my invention described and illustrated herein that the master member's driving stroke is always in the same direction and its setting stroke is always in the same direction. Both embodiments of my invention employ a selector which will move a driving element so as to contact with and drive one blade ring after the other so that for one exposure the inner blade ring is the driven member and for the next exposure the outer blade ring is the driven member. Thus the selector, which is operated during each setting movement of the shutter setting lever, determines the position of the driver with respect to the blade rings.

It should be further noticed that in both forms of my invention the blade rings are directly acted upon by a portion of the master member since the master member of course carries both the selector and the driving element. Therefore, the number of parts required for my improved shutter mechanism are reduced to a minimum, and in the second embodiment of my invention I utilize the blade ring pins 96 and 98 for two purposes, that is to engage the rocker arm to cause simultaneous movement of the two blade rings and to project upwardly into the path of one or the other of the driving pins 106 or 107 carried by the driving member 108.

While it is obvious that many changes embodying my invention can readily be made, I consider as within the scope of my invention all such modifications as may come within the terms of the appended claims.

I claim:

1. In a camera shutter of the type including a casing, an exposure aperture therein, a pair of blade rings movably mounted on the casing, a rocker arm for moving the blade rings in opposite directions, double-ended blades carried by and movable with the blade rings, the combination with said blade rings, of a master member movable in one direction for driving the blade rings, a setting member for moving the master member in an opposite direction for setting the master member, and mechanism including a driving pin for engaging and driving one blade ring for making one exposure and then engaging and driving the other blade ring for making the next exposure, both from said master member moving in one driving direction, said mechanism including a selector for positioning the driving pin and carried by the master member, and movable thereby into positions to alternately engage the blade rings, and means actuated by setting the master member for moving the selector.

2. In a camera shutter of the type including a casing, an exposure aperture therein, a pair of blade rings movably mounted on the casing, a rocker arm for moving the blade rings in opposite directions, double-ended blades carried by and movable with the blade rings, the combination with said blade rings, of a master member movable in one direction for driving the blade rings, a setting member for moving the master member in an opposite direction for setting the master member, and mechanism including a driving pin for driving one blade ring through direct engagement therewith for making one exposure and then directly engaging the other blade ring for making the next exposure, both from said master member moving in one direction, said mechanism including a selector for positioning the driving pin and movably carried by the master member, and means carried by the casing and positioned to engage and move the selector when said setting member is moved.

3. In a camera shutter of the type including a casing, an exposure aperture therein, a pair of blade rings movably mounted on the casing, a rocker arm for moving the blade rings in opposite directions, double-ended blades carried by and movable with the blade rings, the combination with said blade rings, of a master member movable in one direction for driving the blade rings, a setting member for moving the master member in an opposite direction for setting the master member, and mechanism including a driving pin for engaging and driving one blade ring for making one exposure and then directly engaging the other blade ring for making the next exposure, both from said master member moving in one direction, said mechanism including a selector for positioning the driving pin pivotally mounted on the master member, and means carried by the shutter casing and positioned to engage and turn the selector when the setting member is moved towards the end of its master member setting position.

4. In a camera shutter of the type including a casing, an exposure aperture therein, a pair of blade rings movably mounted on the casing, a rock arm for moving the blade rings in opposite directions, double-ended blades carried by and movable with the blade rings, the combination with said blade rings, of a master member movable in one direction for driving the blade rings, a setting member for moving the master member in an opposite direction for setting the master member, and mechanism including a driving pin for engaging and driving one blade ring for making one exposure and then engaging and driving the other blade ring for making the next exposure, both from said master member moving in one exposure making direction, said mechanism including a selector for positioning said driving pin, and means for moving the selector during each setting movement of the master member, said driving pin being movably mounted on the master member and engaging the selector to be positioned thereby, and protuberances on the blade rings to be alternately engaged by the driving pin positioned by the selector.

5. In a camera shutter of the type including a casing, an exposure aperture therein, a pair of blade rings movably mounted on the casing, a rocker arm for moving the blade rings in opposite directions, double-ended blades carried by and movable with the blade rings, the combination with said blade rings, of a master member movable in one direction for driving the blade rings, a setting member for moving the master member in an opposite direction for setting the master member, and mechanism including a driving pin for engaging and driving one blade ring for making one exposure and then for engaging and driving the other blade ring for making the next exposure from said master member moving in its one direction for driving the blade ring, said mechanism including a selector for positioning said driving pin, and means for moving the selector during each setting movement of the master member, said driving pin being movably mounted on the master member and engaging the selector to be positioned thereby, a protuberance on each blade ring, said driving pin being carried by the driver, means for holding the driver against the selector to position the driving pin for engaging and driving either of the blade ring protuberances.

6. In a camera shutter of the type including a casing, an exposure aperture therein, a pair of blade rings movably mounted on the casing, a rocker arm for moving the blade rings in opposite directions, double-ended blades carried by and movable with the blade rings, the combination with said blade rings, of a master member movable in one direction for driving the blade rings, a setting member for moving the master member in an opposite direction for setting the master member, and mechanism including a driving pin for engaging and driving one blade ring for making one exposure and then for engaging and driving the other blade ring for making the next exposure from said master member moving in its one direction for driving the blade ring, said mechanism including a selector comprising a pivoted cam for positioning the driving pin, means for moving the cam at each actuation of the setting lever, and a driver carrying said driving pin resting against and movable by the cam to be moved thereby to position said driving pin for alternately driving the blade rings.

7. In a camera shutter of the type including a casing, an exposure aperture therein, a pair of blade rings movably mounted on the casing, a rocker arm for moving the blade rings in opposite directions, double-ended blades carried by and movable with the blade rings, the combination with said blade rings, of a master member movable in one direction for driving the blade rings, a setting member for moving the master member in an opposite direction for setting the master member, and mechanism including a driving pin for engaging and driving one blade ring for making one exposure and then engaging and driving the other blade ring for making the next exposure from said master member, said mechanism including a selector comprising a pivoted cam for positioning the driving pin and carried by the master member, a ratchet affixed to the cam, a pawl carried by the shutter for moving the ratchet at each actuation of the setting lever, said driving pin being movable by the cam for positioning the driving pin for engaging the blade rings alternately.

8. In a camera shutter of the type including a casing, an exposure aperture therein, a pair of blade rings movably mounted on the casing, a rocker arm for moving the blade rings in opposite directions, double-ended blades carried by and movable with the blade rings, the combination with said blade rings, of a master member movable in one direction for driving the blade rings, a setting member for moving the master member in an opposite direction for setting the master member, and mechanism including a driving pin for engaging and driving one blade ring for producing one exposure and then engaging and driving the other blade ring for producing the next exposure, both from said master member moving in one direction for driving the blade rings, said mechanism including a selector comprising a pivoted cam for positioning said driving pin and carried by the master member, a ratchet affixed to the cam, a pawl carried by the shutter for moving the ratchet at each actuation of the setting lever, a driver carrying said driving pin movable by the cam, said cam including a plurality of surfaces every other one of which is spaced equal distances from a center of rotation of the cam and alternate surfaces being spaced different distances from the center of rotation whereby said driving pin may be alternately positioned for driving first one blade ring and then the other blade ring when said cam is moved in the same driving direction with the master member, the cam being positioned by the pawl in setting the master member by moving the setting lever in a setting direction.

9. In a camera shutter of the type including a casing, an exposure aperture therein, double-ended blades for opening and closing the exposure aperture, a pair of blade rings oscillatably mounted on the casing to which each blade is operably connected, a rocker arm pivotally mounted on the casing and connected to each blade ring for moving one blade ring from the other and in an opposite direction, a master member having a rest position and a set position, a spring always tending to move the master member through an operative stroke from the set to the rest position, means for setting and means for releasing the master member, mechanism at least partially carried by the master member for driving one blade ring by the master member including a movable member through one operative stroke of the master member and means for shifting the movable member for driving the other blade ring during the next operative stroke of the master member, the operative strokes of the master member always driving in the same direction whereby the shutter blades may move in one direction for one exposure and in an opposite direction for the next exposure.

10. In a camera shutter of the type including a casing, an exposure aperture therein, double-ended blades for opening and closing the exposure aperture, a pair of blade rings oscillatably mounted on the casing to which each blade is operably connected, a rocker arm pivotally mounted on the casing and connected to each blade ring for moving one blade ring from the other and in an opposite direction, a master member having a rest position and a set position, a spring always tending to move the master member through an operative stroke from the set to the rest position, means for setting and means for releasing the master member, mechanism at least partially carried by the master member for driving one blade ring by the master member including a movable member through one operative stroke of the master member and means for shifting the movable member automatically through movement of the means for setting the master member, whereby the shutter blades may be moved in one direction for one exposure and in an opposite direction for the next exposure, opening and closing the exposure aperture at each movement in either direction.

CLARENCE W. CARROLL.